US008030793B2

(12) United States Patent
Garvey

(10) Patent No.: US 8,030,793 B2
(45) Date of Patent: Oct. 4, 2011

(54) POWER GENERATION

(75) Inventor: Seamus Dominic Garvey, Nottingham (GB)

(73) Assignee: The University of Nottingham, Nottingham (GB)

( * ) Notice: Subject to any disclaimer, the term of this patent is extended or adjusted under 35 U.S.C. 154(b) by 678 days.

(21) Appl. No.: 12/096,523

(22) PCT Filed: Dec. 6, 2006

(86) PCT No.: PCT/GB2006/004577
§ 371 (c)(1),
(2), (4) Date: Sep. 25, 2008

(87) PCT Pub. No.: WO2007/066117
PCT Pub. Date: Jun. 14, 2007

(65) Prior Publication Data
US 2011/0169275 A1   Jul. 14, 2011

(30) Foreign Application Priority Data

Dec. 7, 2005   (GB) .................................. 0524893.5
Jan. 4, 2006   (GB) .................................. 0600055.8

(51) Int. Cl.
*F03B 13/10*   (2006.01)
*F04B 49/00*   (2006.01)
(52) U.S. Cl. .............................. 290/54; 290/43; 60/410
(58) Field of Classification Search .................... 290/42, 290/43, 44, 53, 54, 55; 60/410, 415
See application file for complete search history.

(56) References Cited

U.S. PATENT DOCUMENTS

| | | | | |
|---|---|---|---|---|
| 4,281,257 A * | 7/1981 | Testa et al. ...................... | 290/42 |
| 4,454,429 A * | 6/1984 | Buonome ........................ | 290/53 |
| 4,560,884 A * | 12/1985 | Whittecar ....................... | 290/42 |
| 5,027,000 A * | 6/1991 | Chino et al. .................... | 290/53 |
| 5,179,837 A * | 1/1993 | Sieber ............................. | 60/500 |
| 5,394,695 A * | 3/1995 | Sieber ............................. | 60/398 |
| 5,986,349 A * | 11/1999 | Eberle ............................. | 290/53 |
| 6,388,342 B1 * | 5/2002 | Vetterick et al. ................ | 290/53 |
| 6,647,716 B2 * | 11/2003 | Boyd .............................. | 60/398 |
| 7,832,207 B2 * | 11/2010 | McBride et al. ................ | 60/410 |
| 2006/0137349 A1 | 6/2006 | Pflanz | |

FOREIGN PATENT DOCUMENTS

| | | |
|---|---|---|
| EP | 1 536 541 A1 | 6/2005 |
| FR | 2 842 960 A | 1/2004 |
| JP | 63 012834 A | 1/1988 |

OTHER PUBLICATIONS

"Wind Power—Exploring Underground Resources," Modern Power Systems, XP009028954, Sep. 30, 2003, pp. 38-39, vol. 23, No. 9, ISSN: 0260-7840, Wilmington Publishing, Wilmington, GB.
"Life Cycle Energy Requirements and Greenhouse Gas Emissions from Large Scale Energy Storage Systems", Energy Conversion and Management, XP004496789, Aug. 2004, pp. 2153-2172, vol. 45, No. 13-14, p. 2159, paragraph 4, p. 2160, Figure 1, ISSN: 0196-8904, Elsevier Science Publishers, Oxford, GB.

* cited by examiner

*Primary Examiner* — Nicholas Ponomarenko
(74) *Attorney, Agent, or Firm* — Oliff & Berridge, PLC

(57) ABSTRACT

A power generating system 10 includes a drive arrangement 12 and a compressor 18 arranged to be driven by the drive arrangement 12 to compress gas, in particular air. The system 10 also includes an underwater storage arrangement 20 for storing compressed gas provided by the compressor 18 and an expander 22 for expanding compressed gas from the underwater storage arrangement 20 and/or the compressor 18 to thereby drive a generator 16 to generate electrical power.

42 Claims, 4 Drawing Sheets

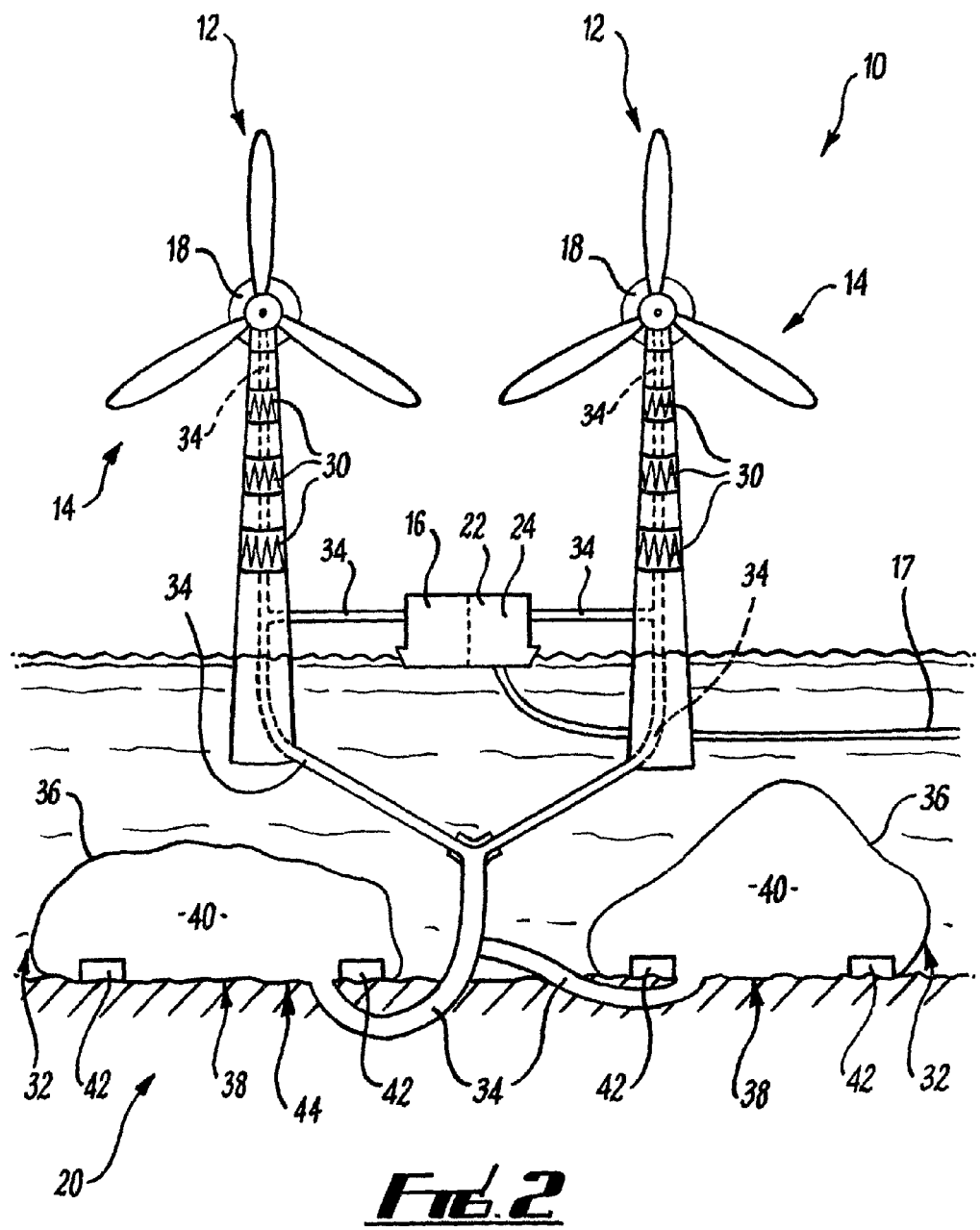

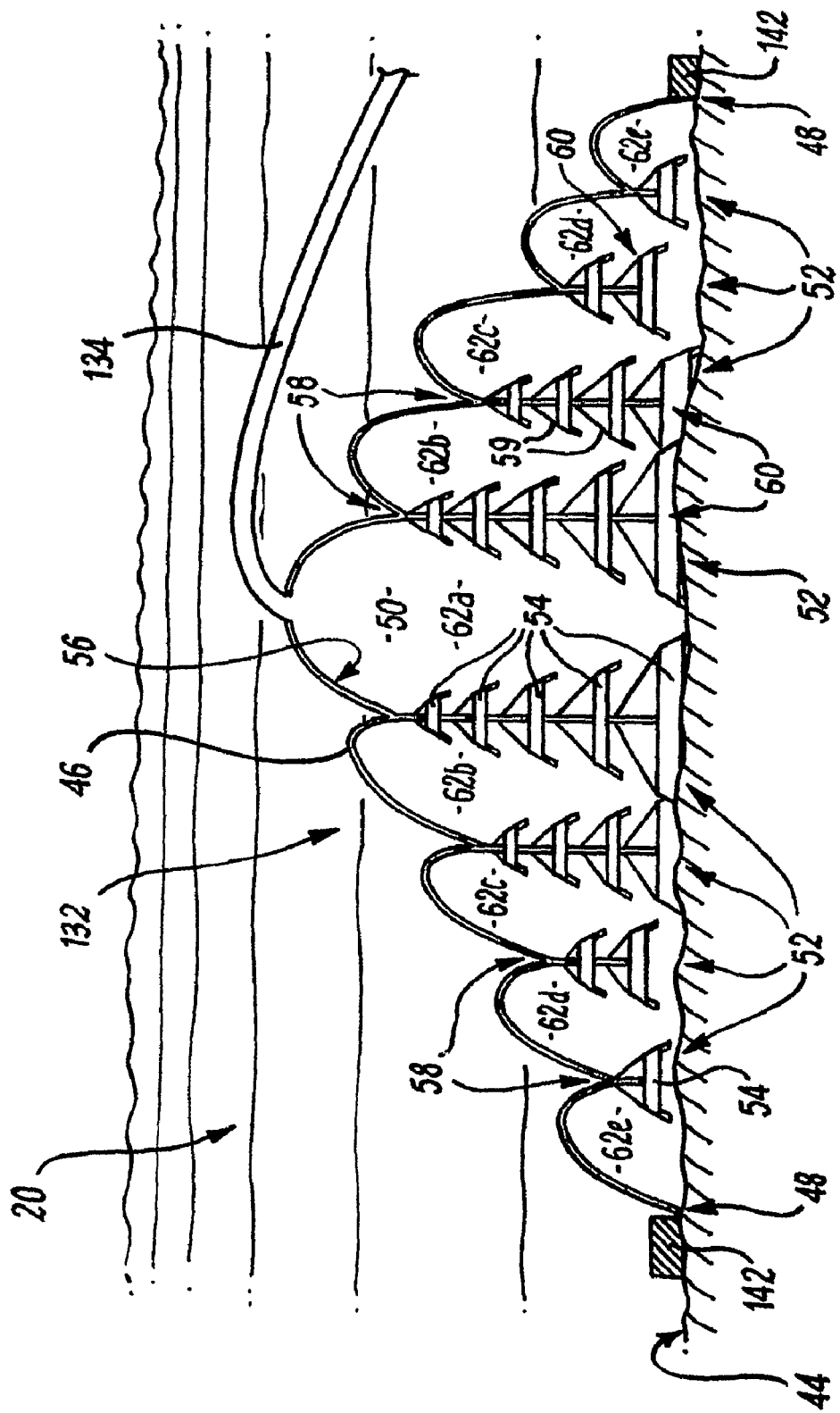

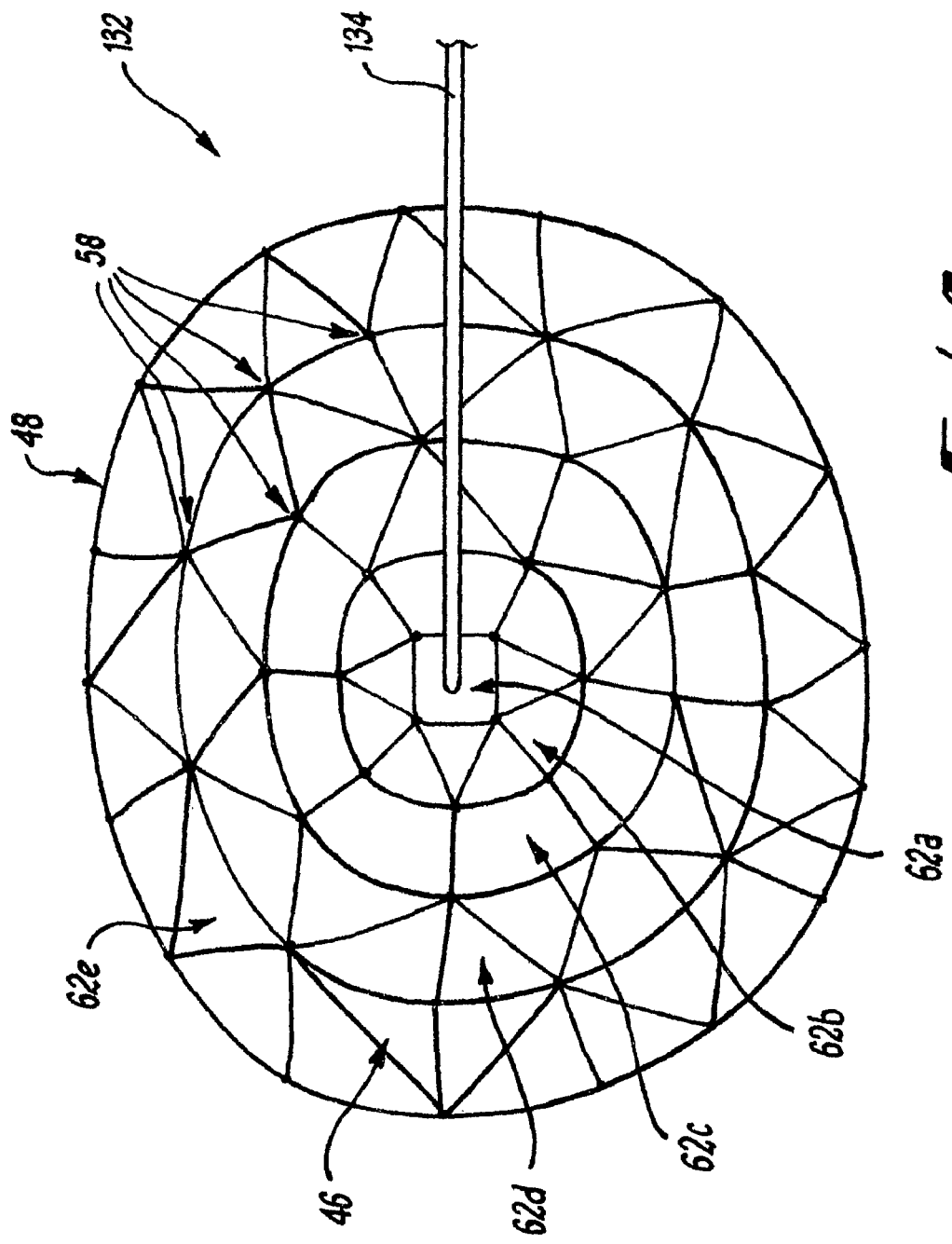

POWER GENERATION

CROSS REFERENCE TO RELATED APPLICATION

This application claims benefit of priority of International Application No. GB 0524893.5, filed on Dec. 7, 2005, and GB 0600055.8, filed on Jan. 4, 2006.

FIELD OF THE INVENTION

Embodiments of the present invention relate to a power generating system and/or an underwater storage arrangement for storing gas, possibly for use with a power generating system to generate electrical power.

BACKGROUND TO THE INVENTION

The case for power generation using renewable energy sources is now abundantly clear, and wind-energy converters, such as wind turbines, are commonly employed for this purpose. In many cases, it is appropriate to locate the wind-energy converters and associated generators off-shore.

In the case of most present-day wind-turbines, an electrical generator is mechanically connected to the wind turbine rotor. One problem associated with the use of such wind turbines is that the utilization of the generators associated with the turbines is relatively low because, in times when there is little or no wind, they are not being driven to any significant proportion of their maximum capacity. Consequently, it would be desirable to improve the utilization of the generators to provide more effective and efficient power generation.

BRIEF DESCRIPTION OF THE INVENTION

According to a first aspect of the invention, there is provided a power generating system comprising:
a drive arrangement;
a compressor arranged to be driven by the drive arrangement to compress gas;
an underwater storage arrangement for storing compressed gas provided by the compressor; and
an expander arranged to expand compressed gas to thereby drive a generator to generate electrical power.

According to a second aspect of the invention, there is provided a power generating system comprising:
a drive arrangement;
a compressor arranged to be driven by the drive arrangement to compress gas;
an underwater storage arrangement for storing some of the compressed gas provided by the compressor; and
an expander arranged to expand compressed gas from the underwater storage arrangement and/or from the compressor and to thereby drive a generator to generate electrical power.

According to a third aspect of the invention, there is provided a method for generating electrical power, the method comprising compressing gas, storing the compressed gas in an underwater storage arrangement and expanding the compressed gas, wherein the expansion of the compressed gas drives a generator to generate electrical power.

According to a fourth aspect of the invention, there is provided a method for generating electrical power, the method comprising compressing gas using a compressor, storing some of the compressed gas in an underwater storage arrangement and expanding the compressed gas either directly from the compressor or from the underwater storage arrangement, wherein the expansion of the compressed gas drives a generator to generate electrical power.

According to a fifth aspect of the present invention, there is provided an underwater storage arrangement for storing a gas, the arrangement comprising a deformable storage tank defined by a flexible member to provide a variable storage volume for storing gas and a plurality of weight members attached to the flexible member.

The underwater storage arrangement may be arranged to store a proportion of the compressed gas provided by the compressor and the remaining proportion of the compressed gas may be fed to the expander. The expander may be arranged to expand compressed gas from the underwater storage arrangement and/or directly from the compressor to thereby drive the generator to generate electrical power.

The gas may be compressed air.

The drive arrangement may include a turbine. The turbine may be a wind turbine. The compressor may be driven directly by the drive arrangement.

The gas compressed by the compressor may be air. The expander may thus be an air turbine.

The system may include a heat recovery arrangement which may recover heat from the compressed gas and which may thereby reduce its temperature after compression by the compressor and prior to storage in the underwater storage arrangement.

The system may include a heating arrangement which may be arranged to heat the compressed gas recovered from the underwater storage arrangement. The heating arrangement may be arranged to heat the recovered compressed gas prior to expansion in the expander.

The expander may include multiple expansion stages and the heating arrangement may be arranged to heat the recovered compressed gas between expansion stages to heat the recovered compressed gas.

The heating arrangement may utilize heat recovered by the heat recovery arrangement.

The heating arrangement may include solar heating means for heating or partially heating the recovered compressed gas prior to expansion and/or between expansion stages, prior to a final expansion stage.

The heating arrangement may be arranged to recover heat from water surrounding the underwater storage arrangement and may be arranged to utilize said recovered heat to heat the compressed gas between expansion stages.

The underwater storage arrangement may comprise one or more storage tanks. When the underwater storage arrangement comprises more than one storage tank, said storage tanks may be in fluid communication with each other.

A plurality of conduits may extend between the storage tanks and may provide said fluid communication between the storage tanks.

The or each storage tank may be deformable, and may thereby define a variable storage volume for storing gas.

The or each deformable storage tank may be defined by a flexible member. The flexible member may comprise a flexible bag which may define an enclosed storage volume for the gas.

The flexible member may include an edge which may be located adjacent to or which may be attached to the seabed to define, in combination with the seabed, a substantially enclosed storage volume for the gas.

The underwater storage arrangement may include a plurality of weight members attached to the flexible member.

The weight members may be arranged to control the pressure of the gas stored in the deformable storage tank. The weight members may be arranged to control the pressure variation of gas in the deformable storage tank as gas is introduced into or evacuated from the deformable storage tank. The weight members may be arranged to minimize the increase in average pressure of the gas in the deformable storage tank as gas is introduced into the storage tank.

The weight members may be arranged to maintain the gas stored in the deformable storage tank at a generally constant pressure irrespective of the volume of gas stored in the storage tank.

The weight members may be arranged to control the deformation of the flexible member and may be arranged to control the stresses in that the flexible member.

The weight members may be arranged to control the deformation of and/or stresses in the flexible member as gas is introduced into or evacuated from the deformable storage tank.

The weight members may be arranged to control the buoyancy of the deformable storage tank. The weight members may be arranged to control the buoyancy of the deformable storage tank as gas is introduced into or evacuated from the deformable storage tank. The weight members may be arranged to control the buoyancy of the deformable storage tank irrespective of the volume of gas stored in the storage tank.

The deformable storage tank may comprise a plurality of storage regions for storing the gas and the weight members may be arranged to substantially independently control the deformation of the flexible member in those storage regions and possibly thereby control the average pressure of the gas stored in the deformable storage tank.

The weight members may be attached to an inner surface of the flexible member and may depend substantially vertically from the inner surface inside the deformable storage tank.

The storage arrangement may include a plurality of weight arrays and each weight array may comprise one or more of said plurality of weight members.

In the weight arrays comprising a plurality of weight members, the weight members may be of different weights. The weight of the individual weight members of a weight array may increase from a minimum value adjacent a position at which the weight array is connected to the flexible member to a maximum value.

BRIEF DESCRIPTION OF THE DRAWINGS

Embodiments of the present invention will now be described by way of example only and with reference to the accompanying drawings, in which:

FIG. 2 is a diagrammatic view of a power generating system according to one embodiment of the invention;

FIG. 3 is a diagrammatic cross-sectional view of an underwater storage arrangement according to one embodiment of the invention; and FIG. 4 is a diagrammatic plan view of the underwater storage arrangement of FIG. 3.

DETAILED DESCRIPTION OF EMBODIMENTS OF THE INVENTION

Figure 1:
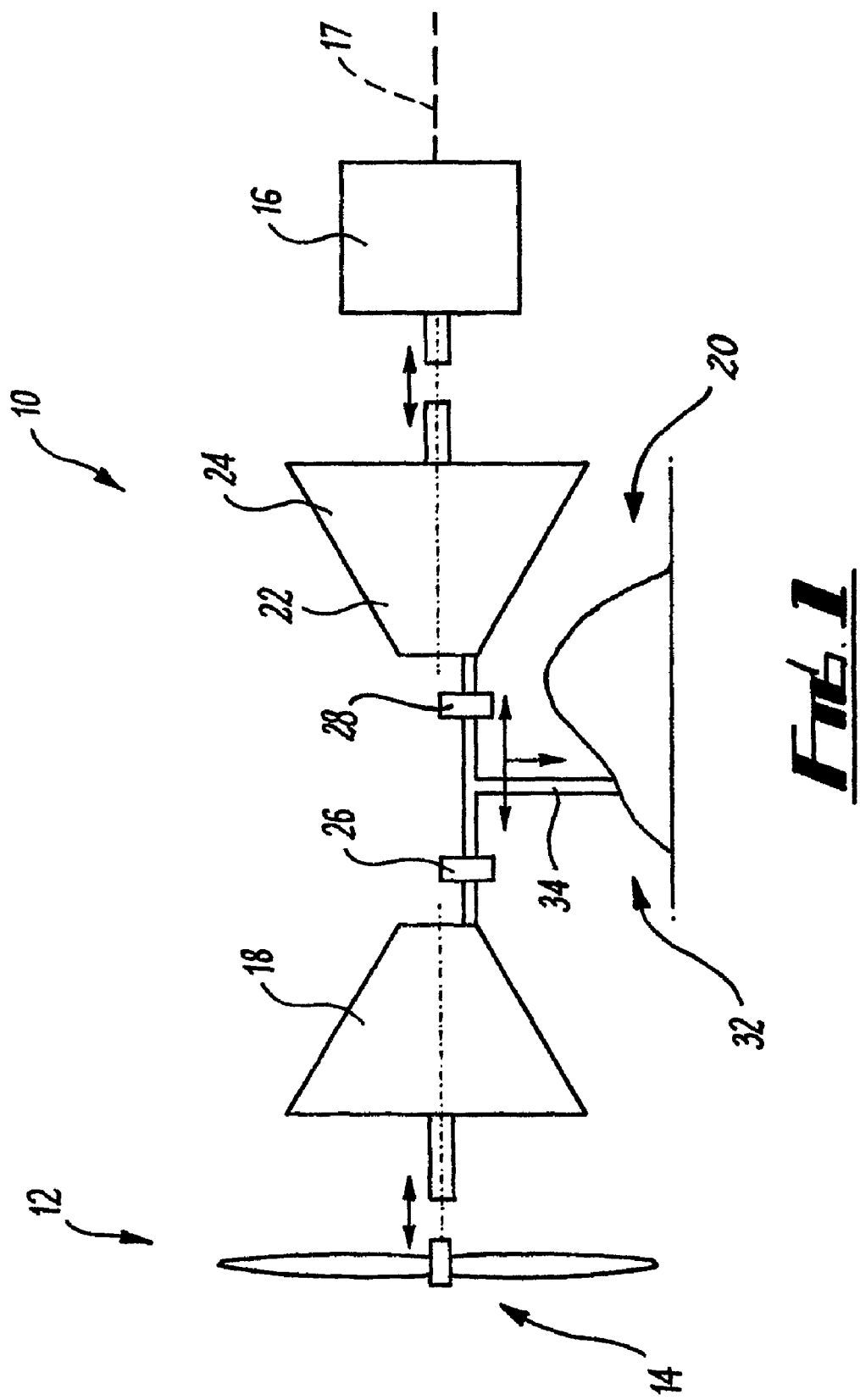
FIG. 1 is a schematic view of a power generating system according to one embodiment of the invention.

Referring initially to FIG. 1, there is shown a power generating system 10 for generating electrical power. The power generating system 10 comprises a drive arrangement 12 in the form of a wind turbine 14 and a generator 16 which generates electrical power in a conventional manner from mechanical motion—either rotation or reciprocating motion. Suitable power transmission cables 17 are provided to transmit the generated electrical power to a desired destination.

The power generating system 10 includes a compressor 18 which is arranged to be driven directly by the drive arrangement 12 to compress gas, and in particular air.

The power generating system 10 further includes an expander 22 in, the form of an air turbine 24, which is arranged to expand compressed air. The expander 22 is arranged to receive compressed air, or at least a proportion of compressed air, directly from the compressor 18 and to expand the received compressed air. Expansion of the received compressed air in this manner causes the expander 22 to drive the generator 16 to thereby generate electrical power.

The power generating system 10 also includes an underwater storage arrangement 20 which may receive a proportion of the compressed air from the compressor 18, the remaining compressed air being fed directly to the expander 22 for expansion thereby, as discussed in the preceding paragraph.

A suitable control arrangement (not shown) may be employed to control the proportions of air fed from the compressor 18 directly to the expander 22 and to the underwater storage arrangement 20, for example by controlling the opening and closing of suitable valves.

By storing compressed air underwater, when there is little or no wind to drive the wind turbine 14 and hence the compressor 18 to provide a sufficient amount of compressed air directly to the air turbine 24 to drive the generator 18 to generate electrical power, compressed air can be delivered from the underwater storage arrangement 20 to the air turbine 24, expansion of the compressed air in the air turbine 24 driving the generator 16 to thereby generate electrical power. Thus, the problem of 'intermittency' associated with conventional wind turbines, which occurs when there is insufficient wind to generate electrical power, can be significantly reduced by employing the power generating system 10 according to the invention. Furthermore, by minimizing the intermittency of the generated electrical power and thereby maintaining a substantially consistent power-transmission rate, power transmission losses can be minimized compared to those that would be experienced with a varying transmission rate.

As indicated above, the deformable storage tank 32 is intended for location underwater. In particular, the deformable storage tank 32 is intended for location in the sea. The power generating system 10 is thus particularly suitable as an offshore power generating system 10 for use in off-shore locations.

Compression of air by the compressor 18 has the effect of increasing the temperature of the air. In order to minimize heat losses to the surrounding water when compressed air is stored in the underwater storage arrangement 20, embodiments of the power generating system 10 include a heat recovery arrangement 26 to reduce the temperature of the compressed air after compression by the compressor 18 and prior to storage in the underwater storage arrangement 20.

As the compressed air stored in the underwater storage arrangement 20 will have a relatively low temperature, in embodiments of the invention the power generating system 10 may include a heating arrangement 28 to heat stored compressed air delivered from the underwater storage arrangement 20 prior to expansion in the air turbine 24. Where the air turbine 24 is a multi-stage air turbine including multiple expansion stages, the temperature of the air will decrease after each expansion stage. Accordingly, the heating arrangement 28 may also be arranged to heat the air between expansion stages, prior to the final expansion stage, to thereby improve efficiency.

In embodiments of the invention, the heating arrangement 28 may be a solar heating arrangement, and may include one or more solar collectors 30 (see FIG. 2).

The heating arrangement 28 may utilize heat recovered by the heat recovery arrangement 26 to heat the compressed air prior to expansion, or at least prior to the final expansion stage, in the air turbine 24, thus improving the efficiency of the power generating system 10. If the heat recovered by the heat recovery arrangement 26 is not utilized by the heating arrangement 28, the recovered heat may be stored or used for some other purpose.

In embodiments where the heating arrangement 28 is not used to heat compressed air from the underwater storage arrangement 20 prior to expansion in the air turbine 24, the compressed air (which will be at substantially ambient temperature) will become extremely cold after one stage of expansion in the air turbine 24. As the water surrounding the underwater storage arrangement 20 (typically seawater) will thus be at a higher temperature than the air after one stage of expansion in the air turbine 24, the heating arrangement 28 may utilize heat from this water to heat the air between expansion stages in the air turbine 24. A suitable heat exchanger may be employed to extract such heat from the water.

FIG. 2 shows diagrammatically a power generating system 10 including two wind turbines 14 and an associated underwater storage arrangement 20 comprising two underwater storage tanks 32 for storing compressed air. The storage tanks 32 are connected to each other and to the compressors 18 associated with each of the wind turbines 14 and to the expander 22 by a plurality of conduits 34, with suitably positioned valves (not shown) controlling the airflow. As is clearly illustrated in FIG. 2, the storage tanks 32 are in fluid communication with each other.

In more detail, each underwater storage tank 32 is deformable to thereby define a variable volume for storing compressed air provided by the or each compressor 18. Each storage tank 32 comprises a flexible member 36, for example comprising a material such as a specially-coated canvas or tarpaulin-type woven cloth. The use of such a flexible member 36 to store the compressed air is possible since the structural integrity required to store the air is provided substantially by the water surrounding the deformable storage tanks 32.

In the embodiment of FIG. 2, the flexible member 36 is in the form of a flexible bag 38 defining an enclosed volume 40 for storing compressed air. In order to counteract the buoyancy forces that arise when compressed air is stored underwater in the flexible bag 28, anchor means in the form of heavy weights 42 are provided to retain the flexible bag 38 firmly on the seabed 44.

Referring now to FIGS. 3 and 4, there is shown another embodiment of an underwater storage arrangement 120. The underwater storage arrangement 120 shares similarities with the underwater storage arrangement 20, and corresponding features are therefore designated using corresponding reference numerals, prefixed by the number '1'

In this embodiment, the underwater storage tank 132 is defined by a flexible member 46 including a peripheral edge 48 which is located adjacent to the seabed 44 and which is held against the seabed 44, using weights 142 for example. In this embodiment, the seabed water pressure reacts the bulk of the forces exerted by the stored compressed air and, accordingly, in combination with the seabed 44, the flexible member 46 defines a substantially enclosed volume 50 for storing compressed air, or indeed any other gas. A conduit 134 enables gas to be supplied to and evacuated from the underwater storage tank 132. This conduit 134 may be positioned at any convenient location on the flexible member 46.

As can be seen most clearly in FIG. 3, a plurality of weight arrays 52, each comprising weight members 54, are attached to an inner surface 56 of the flexible member 46. In use, when compressed air is contained within the enclosed volume 50 defined by the flexible member 46, the weight members 54 of the weight arrays 52 depend from the inner surface 56 of the flexible member 46 in a substantially vertical orientation.

The weight members 54 of each particular weight array 52 are each of different weight (this is illustrated in FIG. 3 by the relative dimensions of the weight members 54, with the smaller weight members 54 being of lower weight than the larger weight members 54). The weight of the individual weight members 54 of each weight array 52 increases from a minimum value adjacent to the region 58 at which the weight array 52 is attached to the inner surface 56 of the flexible member 46, to a maximum value at an opposite end 60 of the weight array 52. The individual weight members 54 of each weight array 52 are connected to each other by virtue of suitable cable 59 or similar means such that the connections between the individual weight members 54 of each weight array 52 are non-rigid.

The deformable storage tank 132 includes a plurality of storage regions 62*a-e*. In the illustrated embodiment, there is a generally central storage region 62*a* surrounded by a plurality of generally annular storage regions 62*b-e*. It should, however, be appreciated that alternative configurations of storage regions may be adopted. In the illustrated embodiment, individual weight arrays 52 are attached to the flexible member 46 at discrete connection regions 58 around the periphery of each storage region 62*a-e*, as best seen in FIG. 4. Local reinforcement of the flexible member 46 may be necessary at these connection regions 58 to accommodate the concentrated load arising from the weight of each weight array 52.

When there is little or no compressed air in the deformable storage tank 132, the flexible member 46 rests on the seabed 44 and the weight members 54 of each weight array 52 rest on top of each other, with the lowermost weight member on the seabed 44. The weights of the individual weight members 54 are selected such that as compressed air is fed into the deformable storage tank 132, the air initially fills the central storage region 62*a* and causes the weight members 54 of the weight arrays 52 around its periphery to slowly lift upwardly. Initially, the uppermost lightest weight member 54 is lifted upwardly off the underlying weight member 54. As the central storage region 62*a* continues to fill with compressed air, the underlying weight members 54, connected by virtue of the cable 59, also lift upwardly, in order of increasing weight.

When a certain volume of compressed air has been fed into the deformable storage tank 132, the compressed air will flow into the first annular storage region 62*b*, and cause the individual weight members 54 of the weight arrays 52 around the periphery of the first annular storage region 62*b* to lift upwardly, in the manner already described above with respect to the central storage region 62*a*. This process continues for the remaining storage regions 62*c-e* as the volume of compressed air in the deformable storage tank 132 continues to increase.

The weight members 54 of the weight arrays 52 thus provide a controlled deformation of the flexible member 46, and in particular a controlled deformation of the flexible member 46 in each storage region 62*a-e*, and thereby provide a reaction against the buoyancy force created by the displaced water. Thus, as the deformable storage tank 132 fills with compressed air or any gas, its buoyancy is controlled by the weight members 54 of the weight arrays 52, and the buoyancy forces which would otherwise act to urge the deformable storage tank 132 to rise upwardly towards the surface of the water are minimized, with the pressure of the stored gas being substantially equal to the pressure of the surrounding water. This is advantageous as it ensures that any buoyancy forces that must be reacted by the weights 142, to retain the peripheral edge 48 of the flexible member 46 adjacent to the seabed 44, are minimized.

The weight members 54 are arranged to control the pressure of compressed air stored in the deformable storage tank 132, for example by controlling the deformation of the flexible member 46 as indicated above. As the deformable storage tank 132 fills with compressed air, the weight members 54 are arranged to minimize the increase in pressure of the compressed air, such that the average pressure of the stored compressed air remains generally constant irrespective of its enclosed volume, or at least such that the average pressure of the stored compressed air is only slightly greater when the deformable storage tank 132 is full or nearly full, compared to when the deformable storage tank 32 is nearly empty. In all cases, the weight members 54 are arranged such that the pressure gradient remains positive, to avoid air being inadvertently drawn into the deformable storage tank 132.

Maintaining the stored compressed air at a substantially constant average pressure, irrespective of the volume of compressed air stored in the deformable storage tank 132, is advantageous where the compressed air from the deformable storage tank 132 is to be expanded in an air turbine 24, since the air turbine 24 will have been designed to operate most efficiently at a particular operating condition (pressure), or at most a small range of conditions (pressures).

Although embodiments of the invention have been described in the preceding paragraphs with reference to various examples, it should be appreciated that various modifications to the examples given may be made without departing from the scope of the present invention, as claimed.

For example, the weight members 54 and other features of the underwater storage arrangement 120 may be incorporated into the underwater storage arrangement 20 to thereby provide the underwater storage arrangement 120 with the same advantages that are discussed above with respect to the underwater storage arrangement 20.

The underwater storage arrangement may be used to store any gas, for example fuel gas, such as natural gas, or waste/poisonous gas, such as $CO_2$ or $SO_2$.

The compressor 18 may be driven by a drive arrangement 12 other than a wind turbine 16. For example, the compressor 18 may be driven by a drive arrangement operated by tidal or wave energy.

Any suitable number of drive arrangements 12, and in particular wind turbines 14, may be provided. Any suitable number of storage tanks 32 may be provided.

Any number of conduits 34, 134 may be connected to each underwater storage tank 32, 132 to enable gas to be supplied to and/or evacuated from each tank 32, 132.

The flexible member 36, 46 may be retained on the seabed using anchor means other than weights 42, 142. For example, a system of ties, possibly steel rods fixed deep into the seabed, may be employed.

The conduits 34, 134 (or a plurality of such conduits) may be positioned at any suitable location on the flexible member 36, 46 to enable compressed gas to be supplied to and/or evacuated from the underwater storage tank 32, 132.

Whilst endeavoring in the foregoing specification to draw attention to those features of the invention believed to be of particular importance, it should be understood that the Applicant claims protection in respect of any patentable feature or combination of features hereinbefore referred to and/or shown in the drawings, whether or not particular emphasis has been placed thereon.

The invention claimed is:

1. A power generating system comprising:
   a drive arrangement;
   a compressor arranged to be driven by the drive arrangement to compress gas;
   an underwater storage arrangement for storing compressed gas provided by the compressor; and
   an expander arranged to expand compressed gas to thereby drive a generator to generate electrical power.

2. A power generating system according to claim 1, wherein the power generating system is arranged such that a proportion of the compressed gas provided by the compressor is fed to the underwater storage arrangement and such that a remaining proportion of the compressed gas is fed to the expander for expansion.

3. A power generating system according to claim 1 or claim 2, wherein the expander is arranged to expand compressed gas from the underwater storage arrangement and/or directly from the compressor to thereby drive the generator to generate electrical power.

4. A power generating system according to any of the preceding claims, wherein the underwater storage arrangement comprises one or more storage tanks.

5. A power generating system according to claim 4, wherein when the underwater storage arrangement comprises more than one storage tank, said storage tanks are in fluid communication with each other.

6. A power generating system according to claim 5, wherein the system includes a plurality of conduits to provide said fluid communication between the storage tanks.

7. A power generating system according to any of claims 4 to 6, wherein the or each storage tank is deformable, thereby defining a variable storage volume for storing compressed gas.

8. A power generating system according to claim 7, wherein the or each deformable storage tank is defined by a flexible member.

9. A power generating system according to claim 8, wherein the flexible member comprises a flexible bag defining an enclosed storage volume for the compressed gas.

10. A power generating system according to claim 8, wherein the flexible member includes an edge located adjacent to or attached to the seabed to define, in combination with the seabed, a substantially enclosed storage volume for the compressed gas.

11. A power generating system according to any of the preceding claims, wherein the drive arrangement includes a turbine.

12. A power generating system according to claim 11, wherein the turbine is a wind turbine.

13. A power generating system according to any of the preceding claims, wherein the compressor is directly driven by the drive arrangement.

14. A power generating system according to any of the preceding claims, wherein the gas is air.

15. A power generating system according to any of the preceding claims, wherein the expander is an air turbine.

16. A power generating system according to any of the preceding claims, wherein the system includes a heat recovery arrangement to recover heat from the compressed gas and thereby reduce its temperature after compression by the compressor and prior to storage in the underwater storage arrangement.

17. A power generating system according to any of the preceding claims, wherein the system includes a heating arrangement for heating the compressed gas recovered from the underwater storage arrangement.

18. A power generating system according to claim 17, wherein the heating arrangement is arranged to heat the recovered compressed gas prior to expansion in the expander.

19. A power generating system according to claim 17 or claim 18, wherein the expander includes multiple expansion stages and the heating arrangement is arranged to heat the compressed gas between expansion stages.

20. A power generating system according to any of claims 17 to 19, wherein the heating arrangement includes solar heating means to heat or partially heat the recovered compressed gas.

21. A power generating system according to any of claims 17 to 20 when dependent on claim 16, wherein the heating arrangement utilises heat recovered by the heat recovery arrangement to heat the recovered compressed gas.

22. A power generating system according to any of claims 17 to 21, wherein the heating arrangement is arranged to recover heat from the water surrounding the underwater storage arrangement and to utilise said recovered heat to heat the compressed gas between expansion stages.

23. A power generating system according to any of claims 8 to 22, wherein the underwater storage arrangement includes a plurality of weight members attached to the flexible member.

24. A power generating system according to claim 23, wherein the weight members are arranged to control the pressure of compressed gas stored in the deformable storage tank.

25. A power generating system according to claim 23 or claim 24, wherein the weight members are arranged to control the average pressure of compressed gas in the deformable storage tank as compressed gas is introduced into or evacuated from the deformable storage tank.

26. A power generating system according to any of claims 24 to 25, wherein the weight members are arranged to maintain the compressed gas stored in the deformable storage tank at a generally constant average pressure, irrespective of the volume of compressed gas stored in the storage tank.

27. A power generating system according to any of claims 23 to 26, wherein the weight members are arranged to control the deformation of and/or the stresses in the flexible member.

28. A power generating system according to claim 27, wherein the weight members are arranged to control the deformation of and/or stresses in the flexible member as compressed gas is introduced into or evacuated from the deformable storage tank.

29. A power generating system according to any of claims 23 to 28, wherein the weight members are arranged to control the buoyancy of the deformable storage tank.

30. A power generating system according to any of claims 23 to 29, wherein the weight members are arranged to control the buoyancy of the deformable storage tank as compressed gas is introduced into or evacuated from the deformable storage tank.

31. A power generating system according to any of claims 23 to 30, wherein the weight members are arranged to control the buoyancy of the deformable storage tank, irrespective of the volume of compressed gas stored in the storage tank.

32. A power generating system according to any of claims 7 to 31, wherein the deformable storage tank comprises a plurality of storage regions for storing the compressed gas.

33. A power generating system according to claim 32 when dependent on any of claims 23 to 31, wherein the weight members are arranged to substantially independently control the deformation of the flexible member in the storage regions.

34. A power generating system according to any of claims 23 to 33, wherein the weight members are attached to an inner surface of the flexible member and depend substantially vertically from the inner surface inside the deformable storage tank.

35. A power generating system according to any of claims 23 to 34, wherein the underwater storage arrangement includes a plurality of weight arrays, each weight array comprising one or more of said plurality of weight members.

36. A power generating system according to claim 35, wherein, in the weight arrays comprising a plurality of weight members, the weight members are of different weight.

37. A power generating system according to claim 36, wherein the weight of the individual weight members of a weight array increases from a minimum value, at a position at which the weight array is attached to the flexible member, to a maximum value.

38. A method for generating electrical power, the method comprising compressing gas, storing the compressed gas in an underwater storage arrangement and expanding the compressed gas, wherein the expansion of the compressed gas drives a generator to generate electrical power.

39. A method according to claim 38, wherein the underwater storage arrangement comprises a deformable storage tank defining a variable storage volume for storing compressed gas.

40. A method according to claim 38 or claim 39, wherein the underwater storage arrangement is as defined in any of claims 4 to 10 or 23 to 37.

41. A power generating system comprising:
a drive arrangement;
a compressor arranged to be driven by the drive arrangement to compress gas;
an underwater storage arrangement for storing some of the compressed gas provided by the compressor; and
an expander arranged to expand compressed gas from the underwater storage arrangement and/or from the compressor and to thereby drive a generator to generate electrical power.

42. A method for generating electrical power, the method comprising compressing gas using a compressor, storing some of the compressed gas in an underwater storage arrangement and expanding the compressed gas either directly from the compressor or from the underwater storage arrangement, wherein the expansion of the compressed gas drives a generator to generate electrical power.

* * * * *